United States Patent Office 3,449,394
Patented June 10, 1969

3,449,394
PROCESS FOR MAKING SALTS OF PERFLUOROVINYL FLUOROSILICIC ACIDS
Richard Müller and Christian Dathe, Radebeul, and Manfred Dressler, Dresden, Germany, assignors to Institute fur Silikon- und Fluorkarbon-Chemie, Radebeul, Germany
No Drawing. Filed Apr. 6, 1967, Ser. No. 628,844
Int. Cl. C07f 7/12
U.S. Cl. 260—448.2      13 Claims

ABSTRACT OF THE DISCLOSURE

Perfluorovinyl fluorosilicates are prepared by reacting anhydrous alkali metal fluorides with perfluorovinyl trifluoro silane in anyhydrous organic proton-inactive solvents. The organo-fluorosilicates are suitable starting materials for the organylization as well as for the reduction of heavy metal salts; they may also be used for the purification of trifunctional organosilanes or for the separation from mono-and difunctional organosilanes, respectively.

---

The present invention relates to the preparation of salts of complex perfluorovinyl fluorosilicic acids, more particularly of alkali metal salts in non-aqueous solutions.

In the co-pending earlier application of the same inventors, Ser. No. 443,087 filed Mar. 26, 1965, entitled "Method of Producing Salts From Organo-Fluosilicic Acid," a process has been described by which organo-trifluorosilanes are converted into the corresponding salts of organo-fluosilicic acids ($Me_2[RSiF_5]$, etc.) by reaction with metal fluorides, including ammonium fluoride, the reaction being performed in water.

In a further development forming the subject matter of another previous application by the same inventors, together with Dieter Mross, Ser. No. 443,165, also filed Mar. 26, 1965, and entitled "Method for the Preparation of Salts of Organo-Fluosilicic Acids in Non-Aqueous Solvents," it was found that instead of using water as reaction medium, it is possible to carry out the reaction in non-aqueous media.

The present invention is yet another development for the preparation of complex perfluorosilicates, more particularly perfluorovinyl fluorosilicates.

Perhalogenalkyl trifluorosilanes split off the alkyl residue in aqueous solution even in the presence of ammonium- and alkali metal fluorides. For instance, perfluorovinyl trifluorosilane reacts with water as follows:

$$CF_2=CFSiF_3+H_2O \rightarrow CF_2CFH+(HOSiF_3)$$

In the same manner, $F_3Si-CCl_3$ and $(F_3Si)_2CCl_2$ are split (R. Müller and S. Reichel, Chem. Berichte 98:3875/1965/). Thus it is impossible to prepare, for instance, $Na_2[CF_2=CFSiF_5]$, in aqueous solution. It is true that in proton-inactive, anhydrous organic solvents, such as acetonitrile, dioxane or ethers, it is possible to prepare e.g. ammoniumperfluorovinyl pentafluorosilicate of the formula $(NH_4)_2[CF_2=CFSiF_5]$ from perfluorovinyl-trifluorosilane and anhydrous ammonium fluoride, the yield of which is, however, poor; this is due to the fact that side reactions with the ammonium group are prevalent, as shown in the following equations:

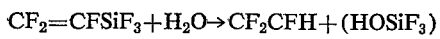

It has now been found that perfluorovinyl fluorosilicates, quite unexpectedly, can be obtained in yields over 90% when instead of ammonium fluoride, the dried fluorides of alkali metals, for instance, NaF and KF, and so on, are reacted with $C_2F_3SiF_3$ in anhydrous organic proton-inactive solvents, e.g. acetonitrile, dioxane or ethers. When, for instance, dry sodium fluoride is used at the start to which is added dropwise and while stirring a solution of fluorosilane in acetonitrile, dioxane or an ether, cooled to −20° to −25° C., the resulting complex salt can be removed by suction after completed reaction, in very high yields. In similar manner the preparation can be made by introducing the fluorosilane into a stirred suspension of fluoride in acetonitrile, in dioxane or in an ether, at room temperature. It is sometimes advisable to remove the liberated reaction heat by special cooling.

The dried complex salts can be used in the same manner as other organo-fluorosilicates. In water they are of limited stability.

The organo-fluorosilicates are suitable starting materials for the organylization as well as for the reduction of heavy metal salts; they may also be used for the purification of trifunctional organosilanes or for the separation from mono- and difunctional organosilanes, respectively.

In the following the invention will be more fully described in a number of examples but it should be understood that these are given by way of illustration and not of limitation.

Example 1

7.5 $NH_4F$ were stirred for several hours with a solution of 17 g. $C_2F_3SiF_3$ (B.P. −20° C.) in 100 ml. acetonitrile which has been cooled to −20° to −25° C.; during stirring, the temperature was maintained at about −25° C. The salts separating after the reaction was complete were separated by suction filtration and dried on a plate of clay. Yield: 14 g.

Analysis showed the following composition: 20% $(NH_4)_2[C_2F_3SiF_5]$, 10% $NH_4F$ and 70% $(NH_4)_2SiF_6$.

Example 2

8 g. NaF were stirred for several hours with 21 g. $C_2F_3SiF_3$ in acetonitrile at −25° C.; the complex salt obtained as gelatinous mass is removed by suction filtration and dried on a plate, preferably of clay. Crude yield: 24 g.

Analysis for $C_2F_8Na_2Si$.—Calcd.: 9.6% C, 18.4% Na, 11.2% Si; Found: 8.88% C, 18.6% Na, 10.6% Si.

Consequently, the salt had the following composition: 92% $Na_2[C_2F_3SiF_5]$, 5.3% NaF and 2.7% $Na_2SiF_6$.

The conversion carried out in a similar manner in dioxane (13 g. NaF+30 g. $C_2F_3SiF_3$ in 100 ml.) resulted in a yield of 26 g. salt of the following composition:

Analysis.—Found 6.94% C, 21.7% Na, 12.7% Si. The precipitate after suction filtration thus contained 72% $Na_2[C_2F_3SiF_5]$ and 28% $Na_2[SiF_6]$.

Under the same conditions as described in example 2, above, 4 g. NaF and 10 g. $C_2F_3SiF_3$ were reacted in tetrahydrofuran, whereby 8 g. of a salt were obtained which, by analysis, was found to have the following composition: 8.58% C, 0.77% H, 29.3% Na, 7.6% Si.

The salt, therefore, consists of 66% $Na_2[C_2F_3SiF_5]$; 31% NaF, and 3% solvent, which could not be eliminated by the usual methods of drying.

Example 3

6 g. KF dried at 400° C. were reacted under the conditions described in Example 2, with 11 g. $C_2F_3SiF_3$ in 100 ml. acetonitrile. After suction filtration and drying, 10 g. salt were obtained. Analysis showed the following composition: 84% $K_2[C_2F_3SiF_5]$, 13.5% KF and 2.5% $K_2SiF_6$.

Carried out in a similar manner in dioxane (12 g. KF+22 g. $C_2F_3SiF_3$ in 100 ml.) gave a yield of 26.5 g. salt of the following analysis: found 5.02% C, 29.9% K, 12.3% Si.

The salt mixture remaining after suction filtration had the following composition: 59% $K_2[C_2F_3SiF_5]$, 38% $K_2SiF_6$ and 3% $SiO_2$.

While we have described certain embodiments of the invention it should be understood that the foregoing disclosure relates only to preferred embodiments which are intended to include all changes and modifications of the examples described within the scope of the invention as set forth on the appended claims.

What we claim is:

1. A process for preparing complex salts of perfluorovinyl fluorosilicic acids, which comprises reacting perfluorovinyl trifluorosilanes with a salt of hydrofluoric acid in a proton-inactive organic solvent.

2. The process as defined in claim 1, wherein the solvent is acetonitrile.

3. The process as defined in claim 1, wherein the solvent is dioxane.

4. The process as defined in claim 1, wherein the salt of hydrofluoric acid is an alkali metal salt.

5. The process as defined in claim 1, wherein the salt of hydrofluoric acid is the ammonium salt.

6. The process as defined in claim 4, wherein $Na_2[C_2F_3SiF_5]$ is obtained by reacting NaF with $C_2F_3SiF_3$ at about $-20°$ to $-25°$ C. in acetonitrile.

7. The process as defined in claim 4, wherein $Na_2[C_2F_3SiF_5]$ is obtained by reacting NaF with $C_2F_3SiF_3$ at about $-20°$ to $-25°$ C. in dioxane.

8. The process as defined in claim 5, wherein $(NH_4)_2[C_2F_3SiF_5]$ is obtained by reacting $NH_4F$ with $C_2F_3SiF_3$ at about $-20°$ to $-25°$ C. in acetonitrile.

9. The process as defined in claim 5, wherein $(NH_4)_2[C_2F_3SiF_5]$ is obtained by reacting $NH_4F$ with $C_2F_3SiF_3$ at about $-20°$ to $-25°$ C. in dioxane.

10. The process as defined in claim 4, wherein $K_2[C_2F_3SiF_5]$ is obtained by reacting KF pith $C_2F_3SiF_3$ at about $-20°$ to $-25°$ C. in acetonitrile.

11. The process as defined in claim 4, wherein $K_2[C_2F_3SiF_5]$ is obtained by reacting KF with $C_2F_3SiF_3$ at about $-20°$ to $-25°$ C. in dioxane.

12. The process as defined in claim 1, wherein the solvent is tetrahydrofuran.

13. The process as defined in claim 4, wherein $Na_2[C_2F_3SiF_5]$ is obtained by reacting NaF with $C_2F_3SiF_3$ at about $-20°$ to $-25°$ C. in tetrahydrofuran.

References Cited

FOREIGN PATENTS

| | | |
|---|---|---|
| 981,268 | 1/1965 | Great Britain. |
| 1,395,223 | 3/1965 | France. |

TOBIAS E. LEVOW, *Primary Examiner.*

J. P. PODGORSKI, *Assistant Examiner.*

U.S. Cl. X.R.

252—188